United States Patent
Liu et al.

(10) Patent No.: US 11,669,110 B2
(45) Date of Patent: Jun. 6, 2023

(54) CONTROL SYSTEM BASED ON MULTI-UNMANNED AERIAL VEHICLE COOPERATIVE STRATEGIC CONFRONTATION

(71) Applicant: INSTITUTE OF AUTOMATION, CHINESE ACADEMY OF SCIENCES, Beijing (CN)

(72) Inventors: Zhen Liu, Beijing (CN); Zhiqiang Pu, Beijing (CN); Tenghai Qiu, Beijing (CN); Jianqiang Yi, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 370 days.

(21) Appl. No.: 17/261,036

(22) PCT Filed: Aug. 13, 2020

(86) PCT No.: PCT/CN2020/108774
§ 371 (c)(1),
(2) Date: Jan. 18, 2021

(87) PCT Pub. No.: WO2021/174765
PCT Pub. Date: Sep. 10, 2021

(65) Prior Publication Data
US 2021/0405660 A1    Dec. 30, 2021

(30) Foreign Application Priority Data

Mar. 3, 2020    (CN) .......................... 202010138475.2

(51) Int. Cl.
*G05D 1/10* (2006.01)
*G05D 1/00* (2006.01)

(52) U.S. Cl.
CPC ........... *G05D 1/104* (2013.01); *G05D 1/0088* (2013.01); *G05D 1/0094* (2013.01)

(58) Field of Classification Search
CPC .... G05D 1/104; G05D 1/0088; G05D 1/0094; F41H 13/00
See application file for complete search history.

(56) References Cited

U.S. PATENT DOCUMENTS

2017/0046961 A1* 2/2017 Lee ....................... G08G 5/0069
2017/0131726 A1* 5/2017 Speyer .................. B64C 39/024
(Continued)

FOREIGN PATENT DOCUMENTS

| CN | 105204512 A | 12/2015 |
|---|---|---|
| CN | 105427032 A | 3/2016 |

(Continued)

OTHER PUBLICATIONS

Yangming Kang et al., Beyond-Visual-Range Tactical Game Strategy for Multiple UAVs, Chinese Automation Congress (CAC), 2019, pp. 5231-5236.

(Continued)

*Primary Examiner* — Faris S Almatrahi
*Assistant Examiner* — Abdalla A Khaled
(74) *Attorney, Agent, or Firm* — Bayramoglu Law Offices LLC

(57) ABSTRACT

The control system based on multi-unmanned aerial vehicle (UAV) cooperative strategic confrontation includes a management module, a UAV formation module, a situation assessment module, a decision-making module, and a cooperative mission assigning module of both sides in a confrontation. The management module is configured to store state information acquired by the UAV formation module. The UAV formation module is configured to acquire state information of UAVs and execute a control instruction. The (Continued)

situation assessment module is configured to acquire situation assessment information according to the state information. The decision-making module is configured to acquire a countermeasure based on the situation assessment information. The cooperative mission assigning module is configured to generate control instructions for the UAVs based on the countermeasure and in combination with a confrontation target and an optimal situation assessment value.

11 Claims, 3 Drawing Sheets

(56) References Cited

U.S. PATENT DOCUMENTS

| | | | | |
|---|---|---|---|---|
| 2018/0293909 | A1* | 10/2018 | Lechner | G09B 9/006 |
| 2021/0056861 | A1* | 2/2021 | Lechner | G09B 9/003 |
| 2022/0066477 | A1* | 3/2022 | Shi | B64D 1/18 |

FOREIGN PATENT DOCUMENTS

| | | |
|---|---|---|
| CN | 107463094 A | 12/2017 |
| CN | 110058608 A | 7/2019 |
| CN | 111221352 A | 6/2020 |
| KR | 20180051135 A | 5/2018 |
| KR | 101903678 B1 | 11/2018 |

OTHER PUBLICATIONS

Jiwei Xu et al., Multi-UAV counter-game model based on uncertain information, Applied Mathematics and Computation, 2020, pp. 1-9, vol. 366, 124684.

De-Lin Luo et al., Unmanned aerial vehicles swarm conflict based on multi-agent system, Control Theory & Applications, Nov. 2015, pp. 1498-1504, vol. 32, No. 11.

Xia Chen et al., Fuzzy Dynamic Game Based Operation Strategy for Multiple UAVs, Electronics Optics & Control, Jun. 2014, pp. 20-23, 34, vol. 21, No. 6.

* cited by examiner

CONTROL SYSTEM BASED ON MULTI-UNMANNED AERIAL VEHICLE COOPERATIVE STRATEGIC CONFRONTATION

CROSS REFERENCE TO THE RELATED APPLICATIONS

This application is the national phase entry of International Application No. PCT/CN2020/108774, filed on Aug. 13, 2020, which is based upon and claims priority to Chinese Patent Applications No. 202010138475.2, filed on Mar. 3, 2020, the entire contents of which are incorporated herein by reference.

TECHNICAL FIELD

The present invention belongs to the field of multi-unmanned aerial vehicle (UAV) strategic confrontation, and in particular relates to a control system based on multi-UAV cooperative strategic confrontation.

BACKGROUND

Since it is hard for a single UAV to perform a variety of arduous missions as needed, a multi-UAV cluster technology has become a key technology in the field of UAV applications. Especially in the field of strategic aerial warfare, multi-UAV cooperative strategic confrontation can make full use of reconnaissance, attack and assessment capabilities of each UAV to improve the overall combat level and mission execution efficiency of a UAV system, which is expected to become the trend of aerial warfare in the future. In order to simulate the process of cooperative strategic confrontation of multiple UAVs and implement interactive operations of battlefield surroundings and weapons/outfits, a control system based on multi-UAV cooperative strategic confrontation for a test and verification of multi-UAVs aerial warfare tactical confrontation is desired to be constructed.

The multi-UAV cooperative strategic confrontation means that two or more UAVs cooperate with each other to perform an assigned confrontation mission. In the early stage of UAV strategic confrontation research, due to the influence of dogfight, the UAV strategic confrontation research is mainly based on 1 versus 1. However, in multi-UAV cooperative strategic confrontation, there are many problems such as fast time-varying surrounding information, unstable communication and signal transmission, anti-collision of multiple UAVs, information fusion and mission allocation of multiple UAVs, and cooperative action decision-making of UAV groups. Therefore, a conventional single-UAV strategic confrontation system is difficult to be directly applied to research on multi-UAV strategic confrontation.

SUMMARY

In order to solve the above problem in the prior art, that is, in order to solve the problem that an existing 1-versus-1 UAV strategic confrontation system cannot meet requirements of the research on multi-UAV cooperative strategic confrontation, in a first aspect of the present invention, a control system based on multi-UAV cooperative strategic confrontation is proposed. The system includes a management module and a UAV formation module, a situation assessment module, a decision-making module, and a cooperative mission assigning module of both sides in a confrontation:

the management module is configured to store first information sent by the UAV formation module and send the first information to the situation assessment module;

the UAV formation module is configured to acquire state information of UAVs in UAV formations of a current side and a hostile side as the first information and send the first information to the management module when UAVs of the hostile side are found during a patrol; and the UAV formation module is further configured to control UAVs of the current side to execute a control instruction sent by the cooperative mission assigning module;

the situation assessment module is configured to acquire situation assessment information of the UAVs of the current side based on the first information by presetting a plurality of assessment methods in preset categories;

the decision-making module is configured to conduct statistics, based on the acquired number of UAVs of the both sides in the confrontation, on all maneuvering tactics of the UAVs of the both sides; and in combination with the situation assessment information, the decision-making module is configured to acquire an optimal situation preponderant value of the UAVs of the current side relative to the UAVs of the hostile side to construct a situation matrix of the UAV formation of the current side relative to the UAV formation of the hostile side; and the decision-making module is configured to acquire a countermeasure of the current side based on the situation matrix through a preset tactic selection method; and the cooperative mission assigning module is configured to acquire a confrontation target corresponding to the UAVs of the current side, and in combination with the countermeasure and the optimal situation preponderant value, the cooperative mission assigning module is configured to generate the control instruction for the UAVs of the current side and send the control instruction to the UAV formation module.

In some preferred implementations, the system further includes a view display module; and the view display module is configured to acquire the first state information and strategic confrontation images for output display.

In some preferred implementations, the management module is further configured to perform system configuration and strategic confrontation performance analysis;

the system configuration includes simulation scheduling management, multi-UAV system initialization of the both sides in the confrontation and discrete event trigger management; wherein the simulation scheduling management includes setting management for system simulation duration, step length, simulation start time, and simulation end time; the multi-UAV system initialization of the both sides in the confrontation is configured to initially set flight states of the UAVs of the both sides in the confrontation; and the discrete event trigger management is configured to perform artificial discrete event setting to suspend a confrontation process of both sides of multiple UAVs; and the strategic confrontation performance analysis includes win rate result analysis, process trend analysis and confrontation time analysis; wherein the win rate result analysis is configured to show a win rate of the both sides in the confrontation in form of a chart; the process trend analysis is configured to display a situation change trend of the both sides in the confrontation in form of a curve; and the confrontation time analysis is configured to display confrontation time of the both sides in form of a chart.

In some preferred implementations, the state information includes positions, velocities, attitude angles and control input information of the UAVs; and the control input information includes longitudinal overload, normal overload and roll angles of the UAVs.

In some preferred implementations, the situation assessment information includes maneuverability assessment information and visual field assessment information; the visual field assessment information includes a distance assessment value, an azimuth angle assessment value and an aspect angle assessment value; and the maneuverability assessment information includes an energy assessment value and an aerial warfare capability assessment value.

In some preferred implementations, a calculation method for the distance assessment value is:

$$T_i^D = \begin{cases} 0, & D_i \geq D_{Rmax} \\ 0.5e^{-\frac{D_i - D_{M\,max}}{D_{R\,max} - D_{M\,max}}}, & D_{M\,max} \leq D_i \leq D_{R\,max} \\ 2^{-\frac{D_i - D_{MK\,max}}{D_{M\,max} - D_{MK\,max}}}, & D_{MK\,max} \leq D_i \leq D_{M\,max} \\ 2^{-\frac{D_i - D_{M\,min}}{D_{M\,min} - D_{MK\,min}}}, & D_{M\,min} \leq D_i \leq D_{MK\,min} \\ 1, & D_{MK\,min} \leq D_i \leq D_{MK\,max} \end{cases}$$

where $T_i^D$ is the distance assessment value, and $D_i$, $D_{R\,max}$, $D_{M\,max}$, $D_{M\,min}$, $D_{MK\,max}$ and $D_{MK\,min}$ respectively represent a relative distance between the $i^{th}$ UAV of the current side and any UAV of the hostile side, a maximum search distance of a fire control radar, a maximum attack distance of an air-to-air missile, a minimum attack distance of the air-to-air missile, a maximum no-escape distance of the air-to-air missile, and a minimum no-escape distance of the air-to-air missile.

In some preferred implementations, a calculation method for the azimuth angle assessment value is:

$$T_i^\Phi = \begin{cases} 0.3\left(1 - \frac{|\Phi_i| - \Phi_{M\,max}}{\Phi_{R\,max} - \Phi_{M\,max}}\right), & |\Phi_{M\,max}| \leq |\Phi_i| \leq |\Phi_{R\,max}| \\ 0.8 - \frac{|\Phi_i| - \Phi_{M\,max}}{2(\Phi_{R\,max} - \Phi_{M\,max})}, & |\Phi_{MK\,max}| \leq |\Phi_i| \leq |\Phi_{M\,max}| \\ 1 - \frac{|\Phi_i|}{5\Phi_{MK\,max}}, & 0 \leq |\Phi_i| \leq |\Phi_{MK\,max}| \\ 0, & |\Phi_i| > |\Phi_{R\,max}| \end{cases}$$

where $\Phi_i$, $\Phi_{R\,max}$, $\Phi_{M\,max}$ and $\Phi_{MK\,max}$ respectively represent an azimuth angle between the $i^{th}$ UAV of the current side and any UAV of the hostile side, a maximum search azimuth angle of a fire control radar, a maximum search azimuth angle of an air-to-air missile, and a maximum no-escape angle of the air-to-air missile, and $T_i^\Phi$ is the azimuth angle assessment value.

In some preferred implementations, a calculation method for the aspect angle assessment value is:

$$T_i^p = \begin{cases} \frac{|p_i|}{\bar{p}}, & |p_i| \leq \bar{p} \\ 1 - \frac{|p_i| - \bar{p}}{180 - \bar{p}}, & \bar{p} \leq |p_i| \leq 180 \end{cases}$$

where $p_i$ and $\bar{p}$ respectively represent an aspect angle between the $i^{th}$ UAV of the current side and any UAV of the hostile side and an aspect angle threshold, and $T_i^p$ is the aspect angle assessment value.

In some preferred implementations, a calculation method for the energy assessment value is:

$$T_i^E = \begin{cases} 1, & \frac{E_i}{E_T} \geq 2 \\ 1 + \frac{0.9(E_i - 2E_T)}{1.5E_i}, & 0.5 \leq \frac{E_i}{E_T} < 2 \\ 0.1, & \frac{E_i}{E_T} < 0.5 \end{cases}$$

where $$E_i = H_i + \frac{V_i^2}{2g}$$

represents an energy value of the $i^{th}$ UAV, $H_i$ is a flight height of the $i^{th}$ UAV, $V_i$ is a flight velocity of the $i^{th}$ UAV, g is a gravitational acceleration coefficient, $E_T$ is an energy value of any UAV of the hostile side, and $T_i^E$ is an energy assessment value of the $i^{th}$ UAV.

In some preferred implementations, a calculation method for the aerial warfare capability assessment value is:

$$T_i^c = [\ln \Sigma B_i + \ln(\Sigma A_i + 1) + \ln(\Sigma D_i)]k_i^1 k_i^2 k_i^3$$

where $B_i$, $A_i$ and $D_i$ respectively represent a maneuverability parameter, a firepower measurement parameter and a detection capability measurement parameter of the $i^{th}$ UAV, $k_i^1$, $k_i^2$ and $k_i^3$ respectively represent a control efficiency coefficient, a survivability coefficient and a range coefficient of the $i^{th}$ UAV, and $T_i^c$ is an aerial warfare capability assessment value of the $i^{th}$ UAV.

In some preferred implementations, in the decision-making module, a method for "acquiring an optimal situation preponderant value of the UAVs of the current side relative to the UAVs of the hostile side to construct a situation matrix of UAV formation of the current side relative to UAV formation of the hostile side" includes:

constructing a first situation matrix of the UAVs of the current side relative to the UAVs of the hostile side based on the maneuvering tactics of the UAVs of the current side and the hostile side and in combination with the situation assessment information; the maneuvering tactics include transverse maneuvering tactics and longitudinal maneuvering tactics of the UAVs, wherein the transverse maneuvering tactics determine a variation of a flight-path drift angle of the UAV, and the longitudinal maneuvering tactics determine a variation of a height of the UAV; and obtaining the optimal situation preponderant value of the UAVs of the current side relative to the UAVs of the hostile side based on situation preponderant values in the first situation matrix through a min-max theorem, and constructing the situation matrix of the UAV formation of the current side relative to the UAV formation of the hostile side.

In some preferred implementations, in the decision-making module, a method for "acquiring a countermeasure of the current side based on the situation matrix through a preset tactic selection method" includes:

sequentially selecting maximum values in the situation matrix, and deleting all elements of rows and columns corresponding to the maximum values in the situation matrix;

accumulating the selected maximum values to obtain an overall situation preponderant value of the UAV formation of the current side relative to the UAV formation of the hostile side; and comparing the overall situation preponderant value with minimum and maximum situation preponderant thresholds based on the overall situation preponderant value and acquiring a countermeasure of the UAV formation of the current side.

In some preferred implementations, a method for "acquiring a confrontation target corresponding to the UAVs of the current side," includes acquiring, according to row and column coordinates corresponding to the maximum values sequentially selected in the situation matrix, the UAVs of the hostile side corresponding to the UAVs of the current side.

The present invention has the following advantages:

The present invention provides a simple and rapid simulation environment for the design, verification and assessment of multi-UAV cooperative strategic confrontation. According to different aerial warfare scenarios and missions, the present invention analyzes state information of UAVs of both sides, assesses situation information of UAVs of a current side relative to UAVs of a hostile side, and obtains an optimal situation preponderant value in combination with possible maneuvering tactics of the UAVs of the both sides, so as to obtain a countermeasure of UAV formation of the current side. Furthermore, based on the countermeasure, the present invention assigns mission instructions of the UAVs and implements visualization of a tactical execution process through a display module, so as to provide a simple and rapid simulation environment for the design, verification and assessment of multi-UAV cooperative strategic confrontation.

Besides, the strategic confrontation control system according to the present invention is designed to have a modular structure, and the model module, the perception module, the decision-making module and the assigning module are independently designed with strong expansibility. For different UAV models, perception algorithms, decision-making algorithms and assigning algorithms, there is no need to make significant changes to the system framework, and the corresponding modules can be replaced provided that input and output data formats are consistent, thus improving the simulation efficiency of multi-UAV cooperative aerial warfare tactics.

BRIEF DESCRIPTION OF THE DRAWINGS

Other features, objectives and advantages of the present application will become more apparent by reading the detailed description of non-restrictive embodiments with reference to the following drawings.

DETAILED DESCRIPTION OF THE EMBODIMENTS

Figure 1:
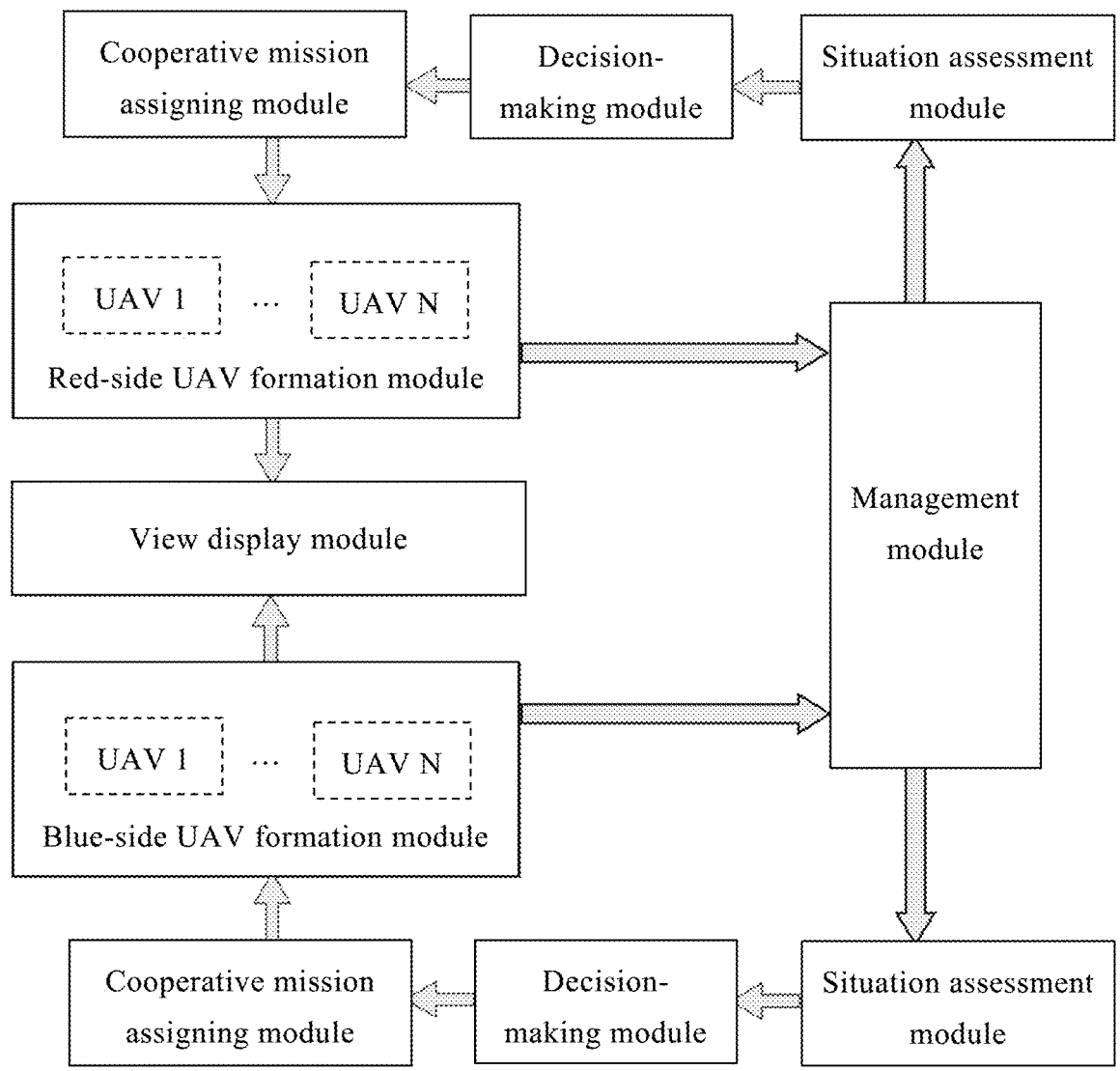
FIG. 1 is a block diagram of a control system based on multi-UAV cooperative strategic confrontation according to an embodiment of the present invention.

To clearly illustrate the objectives, technical solutions, and advantages of the present invention, the technical solutions in embodiments of the present invention are clearly and completely described with reference to the drawings. It is apparent that the embodiments described are only a part of rather than all of the embodiments of the present invention. All other embodiments obtained by those of ordinary skill in the art based on the embodiments of the present invention fall within the protection scope of the present invention.

The present invention is described in further detail below with reference to the drawings and embodiments. It is understandable that the specific embodiments described here are intended only to explain the related invention instead of limiting the present invention. It also needs to be noted that, for ease of description, only parts relevant to the present invention are shown.

It needs to be noted that the embodiments in the present application and features in the embodiments may be combined without conflict.

A control system based on multi-UAV cooperative strategic confrontation according to the present invention includes the following modules: a management module and a UAV formation module, a situation assessment module, a decision-making module, and a cooperative mission assigning module of both sides in a confrontation:

the management module is configured to store first information sent by the UAV formation module and send the first information to the situation assessment module;

the UAV formation module is configured to acquire state information of UAVs in UAV formations of a current side and a hostile side as the first information and send the first information to the management module when UAVs of the hostile side are found during a patrol; and the UAV formation module is further configured to control UAVs of the current side to execute a control instruction sent by the cooperative mission assigning module;

the situation assessment module is configured to acquire situation assessment information of the UAVs of the current side based on the first information by presetting a plurality of assessment methods in preset categories;

the decision-making module is configured to conduct statistics, based on the acquired number of UAVs of the both sides in the confrontation, on all maneuvering tactics of the UAVs of the both sides, and in combination with the situation assessment information, the decision-making module is configured to acquire an optimal situation preponderant value of the UAVs of the current side relative to the UAVs of the hostile side to construct a situation matrix of the UAV formation of the current side relative to the UAV formation of the hostile side; and the decision-making module is configured to acquire a countermeasure of the current side based on the situation matrix through a preset tactic selection method; and the cooperative mission assigning module is configured to acquire a confrontation target corresponding to the UAVs of the current side, and in combination with the countermeasure and the optimal situation preponderant value, the cooperative mission assigning module is configured to generate a control instruction for the UAVs of the current side and send the control instruction to the UAV formation module.

For a better understanding of the control system based on multi-UAV cooperative strategic confrontation according to the present invention, functional modules in an embodiment of the system according to the present invention are described below in detail with reference to the drawings.

As shown in FIG. 1, the system according to the present invention includes a view display module, a management module and a UAV formation module, a situation assessment module, a decision-making module, and a cooperative mission assigning module of both sides in a confrontation. Since the UAV formation module, the situation assessment module, the decision-making module, and the cooperative mission assigning module of both sides in the confrontation are functionally identical, in this embodiment, any one of the modules is selected for description. In FIG. 1, both sides in the confrontation are defined as a red side and a blue side, and the number of UAVs is N.

The management module is configured to store first information sent by the UAV formation module and send the first information to the situation assessment module.

In this embodiment, the management module is configured to acquire state information of UAVs of both sides in the confrontation for storage and send the state information to the situation assessment module; and the management module is further configured to perform system configuration and strategic confrontation performance analysis.

The system configuration includes simulation scheduling management, multi-UAV system initialization of the both sides in the confrontation and discrete event trigger management; wherein the simulation scheduling management includes setting and management for system simulation duration, step length, simulation start time, and simulation end time; the multi-UAV system initialization of the both sides in the game is configured to initially set flight states of the UAVs of the both sides in the game; and the discrete event trigger management is configured to perform artificial discrete event setting to suspend game progress of both sides of multiple UAVs.

The strategic confrontation performance analysis includes win rate result analysis, process trend analysis and confrontation time analysis. The win rate result analysis is configured to show a win rate of the both sides in the confrontation in form of a chart; the process trend analysis is configured to display a situation change trend of the both sides in the confrontation in form of a curve; and the confrontation time analysis is configured to display confrontation time of the both sides in form of a chart.

The UAV formation module is configured to acquire state information of UAVs in UAV formations of a current side and a hostile side as the first information and send first information to the management module when UAVs of the hostile side are found during a patrol; and the UAV formation module is further configured to control UAVs of the current side to execute a control instruction sent by the cooperative mission assigning module.

In this embodiment, the UAV formation module further includes a dynamics and kinematics model, a flight control system, a detection system and a missile model of each UAV. The UAV dynamics and kinematics model is shown in Formula (1):

$$\begin{cases} \dot{X}_i = V_i \cos\gamma_i \sin\psi_i \\ \dot{Y}_i = V_i \cos\gamma_i \cos\psi_i \\ \dot{Z}_i = V_i \sin\gamma_i \\ \dot{V}_i = g(n_{ix} - \sin\gamma_i) \\ \dot{\gamma}_i = g(n_{iz}\cos\phi_i - \cos\gamma_i)/V_i \\ \dot{\psi}_i = gn_{iz}\sin\phi_i/(V\cos_i\gamma) \end{cases} \quad ; \quad (1)$$

where $X_i$, $Y_i$ and $Z_i$ are position information of the $i^{th}$ UAV, $V_i$ is a flight velocity, $\gamma_i$ and $\psi_i$ are respectively a flight-path pitch angle and a flight-path drift angle, and $n_{ix}$, $n_{iz}$ and $\phi_i$ respectively represent longitudinal overload, normal overload and a roll angle.

The flight control system includes a velocity channel controller, a height channel controller, and a flight-path drift angle controller, which are specifically shown below:

Firstly, a virtual control quantity is selected, as shown by Formula (2):

$$\begin{cases} u_{i1} = n_{ix} \\ u_{i2} = n_{iz}\cos\phi_i \\ u_{i3} = n_{iz}\sin\phi_i \end{cases} \quad (2)$$

where $u_{i1}$ is a velocity channel control quantity, $u_{i2}$ is a height channel control quantity, and $u_{a3}$ is a flight-path drift angle control quantity.

A calculation process for $u_{i1}$ is as shown by Formula (3):

$$u_{i1} = \sin\gamma_i + (\dot{V}_{ic} - k_{iV}e_{iV})/g \quad (3);$$

where $k_{iV} > 0$ is a velocity controller parameter, $e_{iV} = V_i - V_{ic}$, $V_{ic}$ is a flight velocity instruction of the $i^{th}$ UAV, and g is a gravitational acceleration coefficient.

A calculation process for $u_{i2}$ is as shown by Formulas (4) and (5):

$$u_{i2} = V_i(-k_{i\gamma}e_{i\gamma} + \dot{\gamma}_{ic})/g + \cos\gamma_i \quad (4);$$

$$\dot{\gamma}_{ic} = (-k_{iz}e_{iz} + \dot{z}_{ic})/V_i \quad (5);$$

where $k_{iz}$, $k_{i\gamma} > 0$ is a height controller parameter, $\gamma_{ic}$ represents a flight-path pitch angle instruction of the $i^{th}$ UAV, $e_{iz} = Z_i - Z_{ic}$, $e_{i\gamma} = \gamma_i - \gamma_{ic}$, and $Z_{ic}$ is a flight height instruction of the $i^{th}$ UAV.

A calculation process for $u^{i3}$ is as shown by Formula (6):

$$u_{i3} = V_i \cos\gamma_i(\dot{\psi}_{ic} - k_{i\psi}e_{i\psi})/g \quad (6);$$

where $k_{i\psi} > 0$ is a flight-path drift angle controller parameter, $e_{i\psi} = \psi_i - \psi_{ic}$, and $\psi_{ic}$ is a flight-path drift angle instruction of the $i^{th}$ UAV.

The virtual control quantity is decoupled based on $u_{i1}$, $u_{i2}$ and $u_{i3}$, and results obtained by decoupling the virtual control quantity are as shown by Formula (7):

$$\begin{cases} n_{ix} = u_{i1} \\ \phi_i = \arctan(u_{i3}/u_{i2}) \\ n_{iz} = u_{i2}/\cos(\arctan(u_{i3}/u_{i2})) \end{cases} \quad ; \quad (7)$$

The detection system model consists of a maximum search distance of a fire control radar, a maximum search azimuth angle of the fire control radar, a maximum attack distance of an air-to-air missile, a minimum attack distance of the air-to-air missile, a maximum search azimuth angle of the air-to-air missile and a maximum no-escape distance of the air-to-air missile, a minimum no-escape distance of the air-to-air missile and a maximum no-escape angle of the air-to-air missile.

The missile model includes a missile dynamics and kinematics model and a guidance model. The missile dynamics and kinematics model is as shown by Formula (8):

$$\begin{cases} \dot{X}_j^M = V_j^M \cos\gamma_j^M \sin\psi_j^M \\ \dot{Y}_j^M = V_j^M \cos\gamma_j^M \cos\psi_j^M \\ \dot{Z}_j^M = V_j^M \sin\gamma_j^M \\ \dot{V}_j^M = g(n_{jx}^M - \sin\gamma_j^M) \\ \dot{\gamma}_j^M = g(n_{jz}^M - \cos\gamma_j^M)/V_j^M \\ \dot{\psi}_j^M = gn_{jy}^M/(V_j^M \cos\gamma_j^M) \end{cases} \quad ; \quad (8)$$

where $X_j^M$, $Y_j^M$ and $Z_j^M$ are position information of the $j^{th}$ missile, $V_j^M$, $\gamma_j^M$ and $\psi_j^M$ are a flight velocity, a trajectory pitch angle and a trajectory drift angle of the $j^{th}$ missile, and $n_{jx}^M$, $n_{jz}^M$ and $n_{jy}^M$ respectively represent three axial overloads of the missile.

The guidance model is as shown by Formula (9):

$$\dot{\theta}_j = K q_j \qquad (9);$$

where $\dot{\theta}_j$ is a rate of change in a velocity vector direction of the $j^{th}$ missile, $q_j$ is a line-of-sight angle rate, and K is a guidance coefficient.

In this embodiment, the state information of the UAVs includes: positions, velocities, attitude angles and control input information of the UAVs; and the control input information includes longitudinal overload, normal overload and roll angles of the UAVs.

The situation assessment module is configured to acquire situation assessment information of the UAVs of the current side based on the first information by presetting a plurality of assessment methods in preset categories.

In this embodiment, based on the state information of the multiple UAVs of the both sides in the confrontation, bilateral factors affecting confrontation capability are extracted to assess a situation of the current side. The situation assessment information includes maneuverability assessment information and visual field assessment information. The visual field assessment information includes a distance assessment value, an azimuth angle assessment value and an aspect angle assessment value. A calculation method for the distance assessment value is as shown by Formula (10):

$$T_i^D = \begin{cases} 0, & D_i \geq D_{Rmax} \\ 0.5 e^{-\frac{D_i - D_{Mmax}}{D_{Rmax} - D_{Mmax}}}, & D_{Mmax} \leq D_i \leq D_{Rmax} \\ 2^{-\frac{D_i - D_{MKmax}}{D_{Mmax} - D_{MKmax}}}, & D_{MKmax} \leq D_i \leq D_{Mmax} \\ 2^{-\frac{D_i - D_{MKmin}}{D_{Mmin} - D_{MKmin}}}, & D_{Mmin} \leq D_i \leq D_{MKmin} \\ 1, & D_{MKmin} \leq D_i \leq D_{MKmax} \end{cases} \qquad (10)$$

where $T_i^D$ is the distance assessment value, and $D_i$, $D_{R\ max}$, $D_{M\ max}$, $D_{M\ min}$, $D_{MK\ max}$ and $D_{MK\ min}$ respectively represent a relative distance between the $i^{th}$ UAV of the current side and any UAV of the hostile side, a maximum search distance of a fire control radar, a maximum attack distance of an air-to-air missile, a minimum attack distance of the air-to-air missile, a maximum no-escape distance of the air-to-air missile, and a minimum no-escape distance of the air-to-air missile.

A calculation method for the azimuth angle assessment value is as shown by Formula (11):

$$T_i^\Phi = \begin{cases} 0.3\left(1 - \frac{|\Phi_i| - \Phi_{Mmax}}{\Phi_{Rmax} - \Phi_{Mmax}}\right), & |\Phi_{Mmax}| \leq |\Phi_i| \leq |\Phi_{Rmax}| \\ 0.8 - \frac{|\Phi_i| - \Phi_{Mmax}}{2(\Phi_{Rmax} - \Phi_{Mmax})}, & |\Phi_{MKmax}| \leq |\Phi_i| \leq |\Phi_{Mmax}| \\ 1 - \frac{|\Phi_i|}{5\Phi_{MKmax}}, & 0 \leq |\Phi_i| \leq |\Phi_{MKmax}| \\ 0, & |\Phi_i| > |\Phi_{Rmax}| \end{cases} \qquad (11)$$

where $\Phi_i$, $\Phi_{R\ max}$, $\Phi_{M\ max}$ and $\Phi_{MK\ max}$ respectively represent an azimuth angle between the $i^{th}$ UAV of the current side and any UAV of the hostile side, a maximum search azimuth angle of a fire control radar, a maximum search azimuth angle of an air-to-air missile, and a maximum no-escape angle of the air-to-air missile, and $T_i^\Phi$ is the azimuth angle assessment value.

A calculation method for the aspect angle assessment value is as shown by Formula (12):

$$T_i^p = \begin{cases} \frac{|p_i|}{\overline{p}}, & |p_i| \leq \overline{p} \\ 1 - \frac{|p_i| - \overline{p}}{180 - \overline{p}}, & \overline{p} \leq |p_i| \leq 180 \end{cases} \qquad (12)$$

where $p_i$ and $\overline{p}$ respectively represent an aspect angle between the $i^{th}$ UAV of the current side and any UAV of the hostile side and an aspect angle threshold, and $T_i^p$ is the aspect angle assessment value.

The maneuverability assessment information includes an energy assessment value and an aerial warfare capability assessment value.

A calculation method for the energy assessment value is as shown by Formula (13):

$$T_i^E = \begin{cases} 1, & \frac{E_i}{E_T} \geq 2 \\ 1 + \frac{0.9(E_i - 2E_T)}{1.5 E_i}, & 0.5 \leq \frac{E_i}{E_T} < 2 \\ 0.1, & \frac{E_i}{E_T} < 0.5 \end{cases} \qquad (13)$$

where $$E_i = H_i + \frac{V_i^2}{2g}$$

represents an energy value of the $i^{th}$ UAV, $H_i$ is a flight height of the $i^{th}$ UAV, $V_i$ is a flight velocity of the $i^{th}$ UAV, g is a gravitational acceleration coefficient, $E_T$ is an energy value of any UAV of the hostile side, and $T_i^E$ is an energy assessment value of the $i^{th}$ UAV.

A calculation method for the aerial warfare capability assessment value is as shown by Formula (14):

$$T_i^c = [\ln\Sigma B_i + \ln(\Sigma A_i + 1) + \ln(\Sigma D_i)] k_i^1 k_i^2 k_i^3 \qquad (14);$$

where $B_i$, $A_i$ and $D_i$ respectively represent a maneuverability parameter, a firepower measurement parameter and a detection capability measurement parameter of the $i^{th}$ UAV, $k_i^1$, $k_i^2$ and $k_i^3$ respectively represent a control efficiency coefficient, a survivability coefficient and a range coefficient of the $i^{th}$ UAV, and $T_i^c$ is an aerial warfare capability assessment value of the $i^{th}$ UAV.

The decision-making module is configured to conduct statistics, based on the acquired number of UAVs of the both sides in the confrontation, on all maneuvering tactics of the UAVs of the both sides, and in combination with the situation assessment information, the decision-making module is configured to acquire an optimal situation preponderant value of the UAVs of the current side relative to the UAVs of the hostile side to construct a situation matrix of the UAV formation of the current side relative to the UAV formation of the hostile side; and the decision-making module is configured to acquire a countermeasure of the current side based on the situation matrix through a preset tactic selection method.

In this embodiment, a countermeasure is decided based on the situation assessment information, and a general mission instruction of a multi-UAV system of the current side is generated. The specific processing is as follows:

The number of the UAVs of the current side and the number of the UAVs of the hostile side participating in the strategic confrontation are n and m, respectively. Each UAV of the current side has $N_A$ maneuvering tactics (the maneuvering tactics are classified into transverse maneuvering tactics and longitudinal maneuvering tactics of the UAVs, wherein the transverse maneuvering tactics determine a variation of a flight-path drift angle of the UAV, and the longitudinal maneuvering tactics determine a variation of a height of the UAV). Each UAV of the hostile side has $M_A$ maneuvering tactics. A situation matrix $S_{ij}$ of the $i^{th}$ UAV of the current side relative to the $j^{th}$ UAV of the hostile side is constructed, as shown by Formula (15):

$$S_{ij} = \begin{bmatrix} T_{11}^{ij} & \cdots & T_{1M_A}^{ij} \\ \vdots & \ddots & \vdots \\ T_{N_A1}^{ij} & \cdots & T_{N_AM_A}^{ij} \end{bmatrix}; \quad (15)$$

where $T_{ab}^{ij}$ is a situation preponderant value of the $i^{th}$ UAV of the current side when the $j^{th}$ UAV of the hostile side executes the $b^{th}$ maneuvering tactic and the $i^{th}$ UAV of the current side selects the $a^{th}$ maneuvering tactic.

An optimal situation preponderant value $S_{ij}(o)$ of the $i^{th}$ UAV of the current side relative to the $j^{th}$ UAV of the hostile side can be obtained based on the situation matrix $S_{ij}$ according to a min-max theorem (that is, a minimum value in each row in a first situation matrix is acquired, and then a maximum value is calculated according to the obtained minimum values in the rows), and the situation matrix S of the UAV formation of the current side relative to the UAV formation of the hostile side is constructed, as shown by Formula (16):

$$S = \begin{bmatrix} S_{11}(o) & \cdots & S_{1m}(o) \\ \vdots & \ddots & \vdots \\ S_{n1}(o) & \cdots & S_{nm}(o) \end{bmatrix}; \quad (16)$$

Based on the situation matrix S, a countermeasure of the UAV formation of the current side is decided, that is, a general mission instruction of the multi-UAV system of the current side. In the embodiment of the present invention, a maximum value (i.e., a value of the maximum element) of the situation matrix S is denoted as $S_{T1}$, then elements in a row and a column of $S_{T1}$, are removed, the maximum value of remaining elements of the situation matrix S is denoted as $S_{T2}$, and $S_{T3}$, . . . , and $S_{Tn}$ are obtained similarly, where n is a natural number, and n represents the number of the maximum element values. In the embodiment of the present invention, a set of situation preponderant values is constructed and summed to obtain an overall situation preponderant value $S_T$ of the UAV formation of the current side relative to the UAV formation of the hostile side, as shown by Formula (17):

$$S_T = \sum_{i=1}^{n} S_{Ti}; \quad (17)$$

When $S_T > \overline{S}$, the countermeasure of the UAV formation of the current side is a frontal assault tactic; when $\underline{S} \leq S_T \leq \overline{S}$, the countermeasure of the UAV formation of the current side is a decoy tactic; when $S_T < \underline{S}$, the countermeasure of the UAV formation of the current side is a defensive split tactic, wherein $\underline{S}$ and $\overline{S}$ represent two thresholds of the overall situation preponderant value of the UAV formation. When the overall situation preponderant value is greater than $\overline{S}$, it indicates that the situation of the UAV formation is advantageous. When the overall situation preponderant value is less than $\underline{S}$, it indicates that the situation of the UAV formation is disadvantageous.

The cooperative mission assigning module is configured to acquire a confrontation target corresponding to the UAVs of the current side, and in combination with the countermeasure and the optimal situation preponderant value, the cooperative mission assigning module is configured generate a control instruction for the UAVs of the current side and send the control instruction to the UAV formation module.

In this embodiment, that the $i^{th}$ UAV of the current side should be assigned to cope with the $j^{th}$ UAV of the hostile side according to the row number i and the column number J of $S_{Ti}$ in the situation matrix S (which indicates that the $i^{th}$ UAV of the current side has the greatest advantage over the $j^{th}$ UAV of the hostile side), and then a set of maneuvering tactics of the $i^{th}$ UAV of the current side is obtained according to the situation matrix $S_{ij}$ of the $i^{th}$ UAV of the current side relative to the $j^{th}$ UAV of the hostile side. An optimal maneuvering tactic is selected in combination with the countermeasure to generate a UAV mission instruction and the UAV mission instruction is sent to the UAV formation module to perform a corresponding mission.

The view display module is configured to acquire the first state information and strategic confrontation images for output display.

Figure 2:
FIG. 2 is a schematic diagram of a view display module software interface of a control system based on multi-UAV cooperative strategic confrontation according to an embodiment of the present invention.

In this embodiment, multi-UAV cooperative strategic confrontation images and state information of the UAVs are output in real time. As shown in FIG. 2, ID is a UAV number, Longitude and Latitude are latitude and longitude of the UAV, Course angle is a course angle of the UAV, Height is a flight height of the UAV, Velocity is a flight velocity of the UAV, ACC is a flight acceleration of the UAV, the "show path" and "hide path" buttons are configured to control whether to display a UAV flight path, the "save track" and "import track" buttons are configured to save a UAV flight path to a specified directory or import a UAV flight path file from a specified directory, the "read mission" and "write mission" buttons are configured to read and write a mission instruction of the UAV formation, the "two-dimensional simulation animation" button is configured to dynamically display a strategic confrontation process of the UAV formation of both sides, the "add waypoint" and "delete waypoint" buttons are configured to manually set UAV position information, and the "start", "pause", "0.5 times speed", "2 times speed" and "4 times speed" buttons are configured to set running parameter information of the simulation software.

Figure 3:
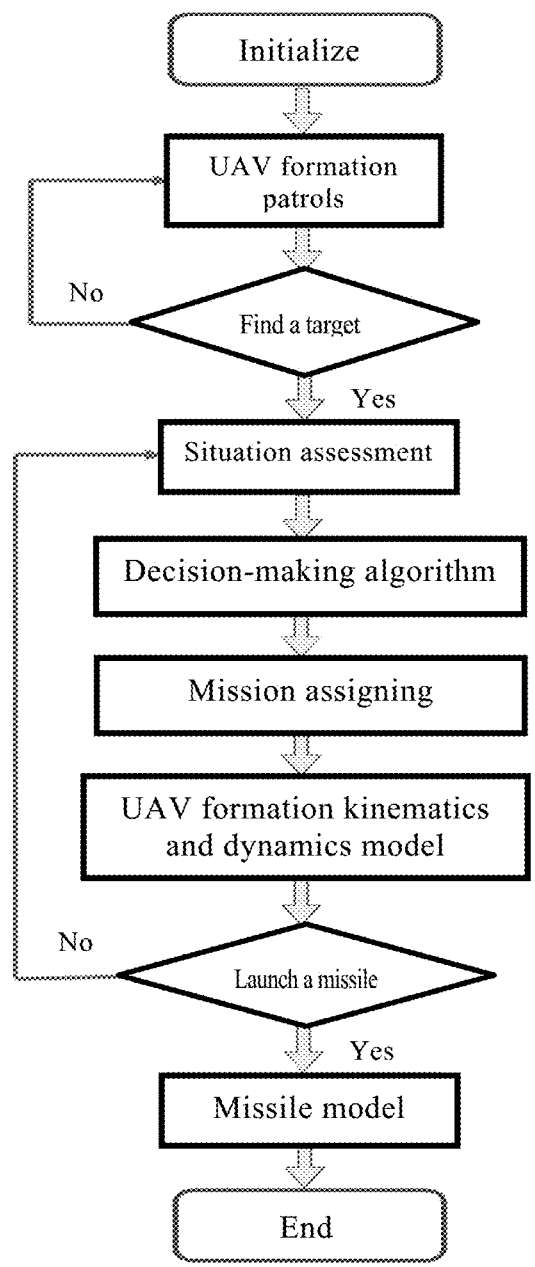
FIG. 3 is a control flowchart of a control system based on multi-UAV cooperative strategic confrontation according to an embodiment of the present invention.

In addition, FIG. 3 shows a flowchart of an execution process of the control system based on multi-UAV cooperative strategic confrontation according to the present invention, including: after system initialization, the UAVs of the current side patrols in a fixed formation, the UAVs of the current side begins to perform a cooperative strategic confrontation mission when finding a target of the hostile side, then situation assessment is performed for state information of the UAV formation of both sides, a countermeasure of the formation of the current side is decided based on the situation assessment information, a single UAV mission instruction in the formation is generated, and when the UAVs of the hostile side are in a no-escape zone of a missile of the current side, a missile system of the current side is activated to launch the missile to strike the enemy according to a missile model.

It needs to be noted that the control system based on multi-UAV cooperative strategic confrontation provided in the above embodiments is illustrated only by the division of the above functional modules. In an actual application, the above functions can be assigned to be completed by different functional modules according to requirements. Therefore, the modules or steps in the embodiments of the present invention can be split or combined. For example, the modules in the above embodiments can be combined into one module or further divided into a plurality of sub-modules to complete all or part of the functions described above. The names of the modules and the steps involved in the embodiments of the present invention are only for the purpose of distinguishing the modules or steps and form no limitation on the present invention.

Those skilled in the art should be aware that the modules and method steps of each example described in the embodiments disclosed herein can be implemented by means of electronic hardware, computer software or a combination of both. Programs corresponding to software modules and method steps may be stored in a random-access memory (RAM), memory, a read-only memory (ROM), an electrically programmable ROM, an electrically erasable programmable ROM, a register, a hard disk, a removable disk, a compact disc read-only memory (CD-ROM), or any other forms of storage media well known in the art. In order to clearly illustrate the interchangeability of electronic hardware and software, the composition and steps of each example are described generally in terms of functions in the above description. Whether these functions are performed in form of electronic hardware or software depends on specific applications and design constraints of the technical solution. Those skilled in the art may use different methods for each particular application to implement the described functions, but such implementation shall not be considered beyond the scope of the present invention.

The terms "first", "second", etc., are used to distinguish similar objects, rather than to describe or indicate a particular order or sequence.

The term "include/comprise" or any other similar term is intended to cover non-exclusive inclusion, so that a process, method, item or device/apparatus including a series of elements not only includes the elements, but also includes other elements not clearly listed or elements inherent to the process, method, item or device/apparatus.

The technical solution of the present invention has thus been described in conjunction with preferred embodiments shown in the drawings. However, it is easy for those skilled in the art to understand that the protection scope of the present invention is obviously not limited to these specific implementations. Those skilled in the art can make equivalent changes or replacements to related technical features without departing from the principle of the present invention. The technical solutions after these changes or replacements all fall within the protection scope of the present invention.

The invention claimed is:
1. A control system based on multi-unmanned aerial vehicle (UAV) cooperative strategic confrontation, comprising a management module, a UAV formation module, a situation assessment module, a decision-making module, a cooperative mission assigning module, and a view display module of both sides in a confrontation;
   the management module is configured to store information sent by the UAV formation module and send the information to the situation assessment module;
   the UAV formation module is configured to acquire state information of UAVs in UAV formations of a current side and a hostile side, use the state information as the information and send the information to the management module when UAVs of the hostile side are found during a patrol; and the UAV formation module is further configured to control UAVs of the current side to execute a control instruction sent by the cooperative mission assigning module;
   the situation assessment module is configured to acquire situation assessment information of the UAVs of the current side based on the information by presetting a plurality of assessment methods in preset categories;
   the decision-making module is configured to conduct statistics, based on a number of UAVs of the both sides in the confrontation, on all maneuvering tactics of the UAVs of the both sides; and in combination with the situation assessment information, the decision-making module is further configured to acquire an optimal situation preponderant value of the UAVs of the current side relative to the UAVs of the hostile side to construct a situation matrix of a UAV formation of the current side relative to a UAV formation of the hostile side; and the decision-making module is further configured to acquire a countermeasure of the current side based on the situation matrix through a preset tactic selection method;
   the cooperative mission assigning module is configured to acquire a confrontation target corresponding to the UAVs of the current side; and in combination with the countermeasure and the optimal situation preponderant value, the cooperative mission assigning module is further configured to generate the control instruction for the UAVs of the current side and send the control instruction to the UAV formation module; and
   the view display module is configured to acquire the state information and strategic confrontation images, and the view display module is further configured to output and display the state information and the strategic confrontation images;
wherein,
the management module is further configured to perform system configuration and strategic confrontation performance analysis;
the system configuration comprises simulation scheduling management, multi-UAV system initialization of the both sides in the confrontation, and discrete event trigger management; wherein the simulation scheduling management comprises setting management for system simulation duration, step length, simulation start time, and simulation end time; the multi-UAV system initialization of the both sides in the confrontation is configured to initially set flight states of the UAVs of the both sides in the confrontation; and the discrete event trigger management is configured to perform artificial discrete event setting to suspend a confrontation process of both sides of multiple UAVs; and
the strategic confrontation performance analysis comprises win rate result analysis, process trend analysis, and confrontation time analysis; wherein the win rate result analysis is configured to show a win rate of the both sides in the confrontation in form of a chart; the process trend analysis is configured to display a situation change trend of the both sides in the confrontation in form of a curve; and the confrontation time analysis is configured to display confrontation time of the both sides in form of a chart.

2. The control system according to claim 1, wherein, the state information comprises positions, velocities, attitude angles, and control input information of the UAVs of the both sides in the confrontation; and the control input information comprises longitudinal overload, normal overload and roll angles of the UAVs of the both sides in the confrontation.

3. The control system according to claim 1, wherein, the situation assessment information comprises maneuverability assessment information and visual field assessment information; the visual field assessment information comprises a distance assessment value, an azimuth angle assessment value and an aspect angle assessment value; and the maneuverability assessment information comprises an energy assessment value and an aerial warfare capability assessment value.

4. The control system according to claim 3, wherein, a calculation method for the distance assessment value is:

$$T_i^D = \begin{cases} 0, & D_i \geq D_{Rmax} \\ 0.5 e^{\frac{D_i - D_{Mmax}}{D_{Rmax} - D_{Mmax}}}, & D_{Mmax} \leq D_i \leq D_{Rmax} \\ 2^{-\frac{D_i - D_{MKmax}}{D_{Mmax} - D_{MKmax}}}, & D_{MKmax} \leq D_i \leq D_{Mmax} \\ 2^{-\frac{D_i - D_{MKmin}}{D_{Mmin} - D_{MKmin}}}, & D_{Mmin} \leq D_i \leq D_{MKmin} \\ 1, & D_{MKmin} \leq D_i \leq D_{MKmax} \end{cases};$$

where $T_i^D$ is the distance assessment value, and $D_i$, $D_{Rmax}$, $D_{M\,max}$, $D_{M\,min}$, $D_{MK\,max}$ and $D_{MK\,min}$ respectively represent a relative distance between an $i^{th}$ UAV of the current side and any UAV of the hostile side, a maximum search distance of a fire control radar, a maximum attack distance of an air-to-air missile, a minimum attack distance of the air-to-air missile, a maximum no-escape distance of the air-to-air missile, and a minimum no-escape distance of the air-to-air missile.

5. The control system according to claim 3, wherein, a calculation method for the azimuth angle assessment value is:

$$T_i^\Phi = \begin{cases} 0.3\left(1 - \frac{|\Phi_i| - \Phi_{Mmax}}{\Phi_{Rmax} - \Phi_{Mmax}}\right), & |\Phi_{Mmax}| \leq |\Phi_i| \leq |\Phi_{Rmax}| \\ 0.8 - \frac{|\Phi_i| - \Phi_{Mmax}}{2(\Phi_{Rmax} - \Phi_{Mmax})}, & |\Phi_{MKmax}| \leq |\Phi_i| \leq |\Phi_{Mmax}| \\ 1 - \frac{|\Phi_i|}{5\Phi_{MKmax}}, & 0 \leq |\Phi_i| \leq |\Phi_{MKmax}| \\ 0, & |\Phi_i| > |\Phi_{Rmax}| \end{cases};$$

where $\Phi_i$, $\Phi_{R\,max}$, $\Phi_{M\,max}$ and $\Phi_{MK\,max}$ respectively represent an azimuth angle between an $i^{th}$ UAV of the current side and any UAV of the hostile side, a maximum search azimuth angle of a fire control radar, a maximum search azimuth angle of an air-to-air missile, and a maximum no-escape angle of the air-to-air missile, and $T_i^\Phi$ is the azimuth angle assessment value.

6. The control system according to claim 3, wherein, a calculation method for the aspect angle assessment value is:

$$T_i^p = \begin{cases} \frac{|p_i|}{\overline{p}}, & |p_i| \leq \overline{p} \\ 1 - \frac{|p_i| - \overline{p}}{180 - \overline{p}}, & \overline{p} \leq |p_i| \leq 180 \end{cases};$$

where $p_i$ and $\overline{p}$ respectively represent an aspect angle between an $i^{th}$ UAV of the current side and any UAV of the hostile side and an aspect angle threshold, and $T_i^p$ is the aspect angle assessment value.

7. The control system according to claim 3, wherein, a calculation method for the energy assessment value is:

$$T_i^E = \begin{cases} 1, & \frac{E_i}{E_T} \geq 2 \\ 1 + \frac{0.9(E_i - 2E_T)}{1.5E_i}, & 0.5 \leq \frac{E_i}{E_T} < 2 \\ 0.1, & \frac{E_i}{E_T} < 0.5 \end{cases};$$

where $$E_i = H_i + \frac{V_i^2}{2g}$$

represents an energy value of an $i^{th}$ UAV of the current side, $H_i$ is a flight height of the $i^{th}$ UAV of the current side, $V_i$ is a flight velocity of the $i^{th}$ UAV of the current side, g is a gravitational acceleration coefficient, $E_T$ is an energy value of any UAV of the hostile side, and $T_i^E$ is the energy assessment value of the $i^{th}$ UAV of the current side.

8. The control system according to claim 3, wherein, a calculation method for the aerial warfare capability assessment value is:

$$T_i^c = [\ln\Sigma B_i + \ln(\Sigma A_i + 1) + \ln(\Sigma D_i)] k_i^1 k_i^2 k_i^3;$$

where $B_i$, $A_i$ and $D_i$ respectively represent a maneuverability parameter, a firepower measurement parameter and a detection capability measurement parameter of an $i^{th}$ UAV of the current side, $k_i^1$, $k_i^2$ and $k_i^3$ respectively represent a control efficiency coefficient, a survivability coefficient and a range coefficient of the $i^{th}$ UAV of the current side, and $T_i^c$ is the aerial warfare capability assessment value of the $i^{th}$ UAV of the current side.

9. The control system according to claim 1, wherein, in the decision-making module, a method for acquiring the optimal situation preponderant value of the UAVs of the current side relative to the UAVs of the hostile side to construct the situation matrix of the UAV formation of the current side relative to the UAV formation of the hostile side comprises:

constructing a situation matrix of the UAVs of the current side relative to the UAVs of the hostile side based on the maneuvering tactics of the UAVs of the current side and the hostile side and in combination with the situation assessment information; the maneuvering tactics comprise transverse maneuvering tactics and longitudinal maneuvering tactics of the UAVs, wherein the transverse maneuvering tactics determine a variation of a flight-path drift angle of the UAV, and the longitudinal maneuvering tactics determine a variation of a height of the UAV; and obtaining the optimal situation preponderant value of the UAVs of the current side relative to the UAVs of the hostile side based on situation preponderant values in the situation matrix of the UAVs of the current side relative to the UAVs of the hostile side through a min-max theorem, and constructing the situation matrix of the UAV formation of the current side relative to the UAV formation of the hostile side.

10. The control system according to claim 1, wherein, in the decision-making module, a method for acquiring the countermeasure of the current side based on the situation matrix through the preset tactic selection method comprises:
   sequentially selecting maximum values in the situation matrix, and deleting all elements of rows and columns corresponding to the maximum values in the situation matrix;
   accumulating the maximum values to obtain an overall situation preponderant value of the UAV formation of the current side relative to the UAV formation of the hostile side; and
   comparing the overall situation preponderant value with minimum and maximum situation preponderant thresholds based on the overall situation preponderant value, and acquiring the countermeasure of the UAV formation of the current side.

11. The control system according to claim 10, wherein, in the cooperative mission assigning module, a method for acquiring the confrontation target corresponding to the UAVs of the current side, comprises: acquiring, according to row and column coordinates corresponding to the maximum values sequentially selected in the situation matrix, the UAVs of the hostile side corresponding to the UAVs of the current side.

* * * * *